United States Patent
Jain

(10) Patent No.: US 11,299,958 B2
(45) Date of Patent: Apr. 12, 2022

(54) COMPOSITIONS AND METHODS FOR WELL COMPLETIONS

(71) Applicant: SCHLUMBERGER TECHNOLOGY CORPORATION, Sugar Land, TX (US)

(72) Inventor: Bipin Jain, Kuala Lumpur (MY)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/750,286

(22) PCT Filed: Aug. 5, 2015

(86) PCT No.: PCT/MY2015/000062
§ 371 (c)(1),
(2) Date: Feb. 5, 2018

(87) PCT Pub. No.: WO2017/023158
PCT Pub. Date: Feb. 9, 2017

(65) Prior Publication Data
US 2018/0215989 A1 Aug. 2, 2018

(51) Int. Cl.
*E21B 33/14* (2006.01)
*C04B 28/04* (2006.01)
(Continued)

(52) U.S. Cl.
CPC .............. *E21B 33/14* (2013.01); *C04B 18/22* (2013.01); *C04B 28/02* (2013.01); *C04B 28/04* (2013.01); *C04B 28/14* (2013.01); *C09K 8/46* (2013.01); *C09K 8/467* (2013.01); *C09K 8/487* (2013.01); *C04B 2103/0052* (2013.01); *Y02W 30/91* (2015.05)

(58) Field of Classification Search
None
See application file for complete search history.

(56) References Cited

U.S. PATENT DOCUMENTS

| | | | | |
|---|---|---|---|---|
| 7,578,347 B2* | 8/2009 | Bosma | ................... | E21B 33/10 166/293 |
| 2004/0007360 A1* | 1/2004 | Leroy-Delage | ......... | C04B 28/02 166/293 |

(Continued)

FOREIGN PATENT DOCUMENTS

EP 2457974 A1 5/2012

OTHER PUBLICATIONS

Nelson EB, Drochon B, Michaux M and Griffin TJ: "Special Cement Systems," in Nelson EB and Guillot D. (eds.): Well Cementing (2nd Edition), Schlumberger, Houston (2006), pp. 233-268.

(Continued)

Primary Examiner — Anuradha Ahuja
(74) Attorney, Agent, or Firm — Garry Brown, Jr.

(57) ABSTRACT

Expansive cements for use in cementing subterranean wells comprise water, an inorganic cement and one or more particulate materials that swell upon contact with a water-immiscible fluid. The cements may further comprise a water-immiscible fluid. Such cements are designed to seal microannuli arising from the presence of water-immiscible fluids on casing surfaces, borehole wall surfaces or both.

12 Claims, 2 Drawing Sheets

(51) Int. Cl.
*C04B 28/02* (2006.01)
*C09K 8/487* (2006.01)
*C04B 28/14* (2006.01)
*C09K 8/46* (2006.01)
*C04B 18/22* (2006.01)
*C09K 8/467* (2006.01)
*C04B 103/00* (2006.01)

(56) References Cited

U.S. PATENT DOCUMENTS

| | | | | |
|---|---|---|---|---|
| 2007/0017676 A1* | 1/2007 | Reddy | ................. | C09K 8/44 |
| | | | | 166/295 |
| 2007/0137528 A1* | 6/2007 | Le Roy-Delage | ...... | C04B 28/02 |
| | | | | 106/718 |
| 2008/0099203 A1* | 5/2008 | Mueller | .............. | C04B 20/1022 |
| | | | | 166/293 |
| 2009/0071650 A1* | 3/2009 | Roddy | ................. | C04B 38/10 |
| | | | | 166/293 |
| 2009/0088348 A1* | 4/2009 | Roddy | ................. | C04B 28/04 |
| | | | | 507/224 |
| 2011/0120715 A1* | 5/2011 | Le Roy-Delage | ........................... | |
| | | | | C04B 24/2652 |
| | | | | 166/292 |
| 2011/0146983 A1* | 6/2011 | Sawdon | ................. | C09K 8/36 |
| | | | | 166/276 |
| 2011/0219668 A1* | 9/2011 | Cramwinckel | .......... | C02F 1/66 |
| | | | | 44/307 |
| 2012/0020051 A1 | 1/2012 | Van Dijk et al. | | |
| 2012/0205106 A1 | 8/2012 | Le Roy0Delage et al. | | |
| 2013/0075096 A1* | 3/2013 | Khalfallah | ......... | C04B 24/2652 |
| | | | | 166/294 |
| 2013/0345098 A1* | 12/2013 | Morris | ................. | C09K 8/032 |
| | | | | 507/119 |
| 2014/0158354 A1* | 6/2014 | Kumar | ................. | E21B 21/003 |
| | | | | 166/293 |
| 2015/0041134 A1 | 2/2015 | Carelli et al. | | |
| 2016/0031731 A1* | 2/2016 | Holland | ................... | C02F 1/48 |
| | | | | 210/695 |
| 2018/0230358 A1 | 8/2018 | Jain | | |

OTHER PUBLICATIONS

Leugemors E, Metson J, Pessin, J-L, Colvard RL, Krauss CD and Plante M: "Cementing Equipment and Casing Hardware," in Nelson EB and Guillot D: Well Cementing¬—Second Edition, Houston, Schlumberger (2006), pp. 343-434.

Nelson EB, Michaux M and Drochon B: "Cement Additives and Mechanisms of Action," in Nelson EB and Guillot D (eds): Well Cementing—Second Edition, Houston, Schlumberger (2006), pp. 49-91.

Reddy et al., "Self-Healing Cements that Heal Without Dependence on Fluid Contact", SPE International Symposium an Oilfield Chemistry, 2009, SPE 121555, 7 pages.

Carrion et al., "Elastic Self-Sealing Cement and Swellable Packer Tool Provides Competent Zonal Isolation to Withstand the Stress Regimes during the Life of the Well: Ecuador Case History", SPE Western Venezuela Section South American Oil and Gas Congress, Society of Petroleum Engineers, SPE 163084, 2011, 11 pages.

International Search Report and Written Opinion issued in International Patent Appl. No. PCT/MY2015/000063 dated Nov. 26, 2015; 10 pages.

International Search Report and Written Opinion issued in International Patent Appl. No. PCT/MY2015/000062 dated May 13, 2016; 10 pages.

Office Action issued in the related RU application 2018107690, dated Mar. 4, 2019 (18 pages).

Office Action issued in the related RU application 2018107688, dated Mar. 4, 2019 (17 pages).

* cited by examiner

COMPOSITIONS AND METHODS FOR WELL COMPLETIONS

BACKGROUND

The statements in this section merely provide background information related to the present disclosure and may not constitute prior art.

This disclosure relates to compositions and methods for treating subterranean formations, in particular, compositions and methods for cementing subterranean wells.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole is necessary to prevent leaks.

Poor cement-sheath bonding may have several negative consequences. Interzonal hydraulic communication may (1) interfere with proper well production, (2) allow formation fluids to corrode the casing, and (3) result in an environmental incident should hydrocarbons or saline fluids commingle with aquifers. The effectiveness of stimulation treatments may also be hampered, further limiting well production. Frequently, poor bonding is manifested by the presence of gaps, or "microannuli," along the cement/casing interface, the cement/formation interface or both.

Cement systems that expand slightly (preferably less than about 1% linear expansion) after setting are a proven means for sealing microannuli and improving primary cementing results. The improved bonding is the result of mechanical resistance or tightening of the cement against the pipe and formation.

Some expansive cement systems rely upon the formation of the mineral ettringite to induce expansion. Ettringite is a calcium sulfoaluminate mineral that forms when the aluminate phases in portland cement react with various forms of added calcium sulfate (usually calcium sulfate hemihydrate). Ettringite crystals have a larger bulk volume than the reactants from which they form; consequently, expansion occurs because of the internal pressure exerted upon crystallization. A limitation of ettringite-based systems is their inability to provide significant expansion at curing temperatures above about 76° C. (170° F.). Ettringite is not stable at higher temperatures and converts to another sulfoaluminate mineral that does not impart expansion.

Another type of expanding cements involves cement slurries containing high concentrations of NaCl, $Na_2SO_4$, or both. After the cement sets, cement expansion occurs because of internal pressure exerted by the crystallization of the salts within pores, and by chlorosilicate and chlorosulfoaluminate reactions. These systems may be effective at temperatures up to 204° C. (400° F.). However, the high cement-slurry salinity may cause casing corrosion, and may interfere with the performance of other cement additives—fluid-loss additives in particular.

Zinc, magnesium, iron and aluminum powders may be used to prepare expansive cements. When added to the high-pH environment of a portland-cement slurry, the metals react and produce hydrogen-gas bubbles. The resulting pressurization causes the cement to expand after setting; however, the effectiveness of these additives may be limited by the ideal-gas law as well depth increases. In addition, the expansive effect may be temporary as the increased pore pressure may dissipate with time.

Addition of calcined calcium oxide or magnesium oxide also may result in cement expansion after setting. The oxide hydration results in the formation of a hydroxide that is less dense than the reactants, thereby providing an expansive force within the cement matrix. These oxide systems have been employed at temperatures up to about 260° C. (500° F.); however, the rate at which they react, and hence the expansion generated, may be difficult to control. If the additive hydrates too quickly (e.g., before the cement sets), little or no cement expansion will occur. If the additives hydrate too slowly, the expansion may occur too late and allow interzonal communication.

A more complete discussion of current expansive cement systems may be found in the following publication. Nelson E B, Drochon B, Michaux M and Griffin T J: "Special Cement Systems," in Nelson E B and Guillot D. (eds.): *Well Cementing* ($2^{nd}$ Edition), Schlumberger, Houston (2006) 233-268.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present application describes a cement system that seals microannuli arising from the presence of water immiscible fluids on the formation, tubular-body surfaces or both.

In an aspect, embodiments relate to methods for cementing a subterranean well having a casing and a borehole surface. The borehole surface and an outer surface of the casing are coated with a water immiscible fluid. A composition is provided that comprises water, an inorganic cement and one or more particulate materials that swell upon contact with the water immiscible fluid, wherein the composition is not an emulsion. The composition is then placed into the well such that the composition contacts the water immiscible fluid. The well has been drilled with a water-base drilling fluid.

In a further aspect, embodiments relate to methods for cementing a subterranean well having a casing and a borehole surface. The borehole surface and an outer surface of the casing are coated with a first water immiscible fluid. A composition is provided that comprises water, an inorganic cement, a second water immiscible fluid and one or more particulate materials that swell upon contact with a water immiscible fluid, wherein the composition is not an emulsion. The composition is then placed into the well.

The subterranean well has been drilled by a non-aqueous drilling fluid.

In yet a further aspect, embodiments relate to cementing a subterranean well having a casing and a borehole surface. A composition is provided that comprises water, an inorganic cement, a first water immiscible fluid and one or more particulate materials that swell upon contact with a water immiscible fluid, wherein the composition is not an emulsion. The well has been drilled by water-base drilling fluid.

DETAILED DESCRIPTION

Figure 1:
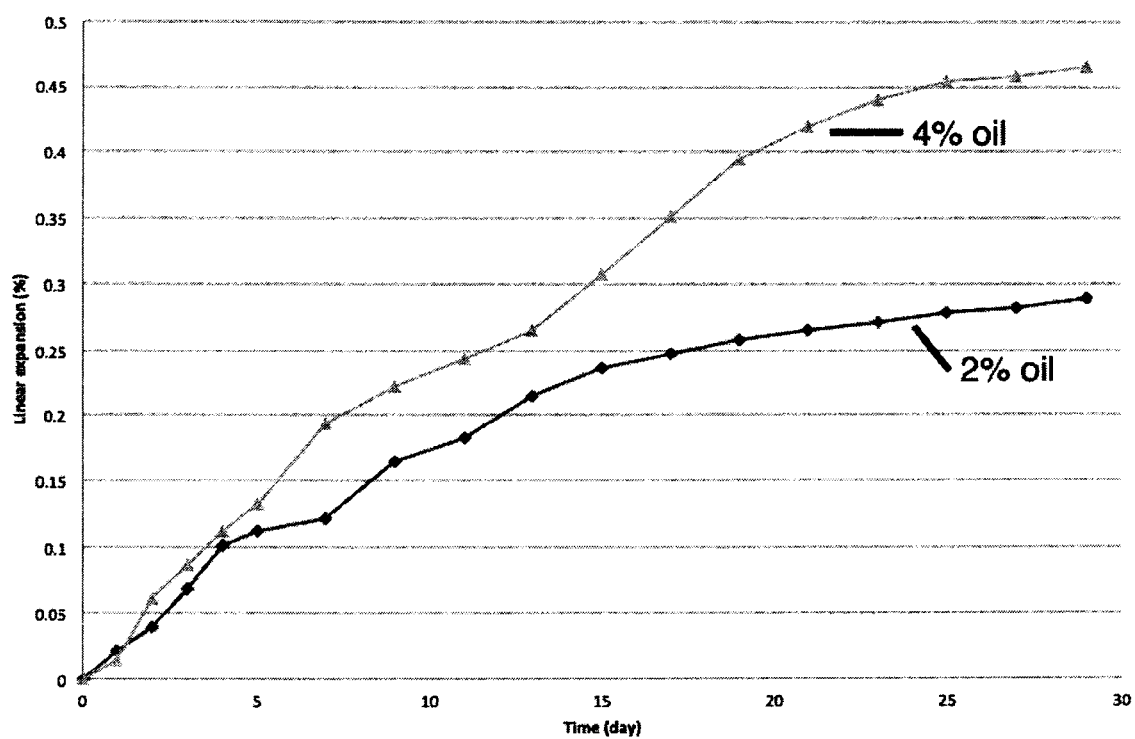
FIG. 1 is a graph showing the linear-expansion behavior of cement systems containing swellable particles and crude oil.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

As stated earlier, there is a need for cement systems having the ability to seal microannuli that arise from the presence of water-immiscible fluids or shrinkage of cements along casing or borehole wall surfaces, or both. Applicant has provided such systems by incorporating particulate materials that are susceptible to swelling when exposed to water-immiscible fluids.

When a water immiscible fluid is incorporated in the cement slurry, the swellable particles may cause the slurry to expand and fill the microannuli during the setting process. Alternatively, if a water immiscible fluid is applied to an outer casing surface and the formation surface before the annulus is filled with the disclosed cement compositions, the swellable particles therein may contact the immiscible fluid coating. The particle swelling may then cause the cement sheath to swell and seal the regions having residual water immiscible fluid. The casing and borehole surfaces may be coated by pumping a water immiscible fluid pill into the well.

Therefore, in an aspect, embodiments relate to methods for cementing a subterranean well having a casing and a borehole surface. A drilling rig is brought to the wellsite. A drill string and drill bit create a borehole, or well, that penetrates one or more subterranean formations. A water-base drilling fluid is employed to lubricate the drill bit and transport drill cuttings to the surface. The drill string is removed and a casing string is inserted into the well. The borehole surface and an outer surface of the casing are then coated with a water immiscible fluid. A composition is provided that comprises water, an inorganic cement and one or more particulate materials that swell upon contact with the water immiscible fluid, wherein the composition is not an emulsion. In other words, the water immiscible fluid is not encapsulated by the water, nor is the water encapsulated by the water immiscible fluid. As a result, the swellable particles have direct access to the water immiscible fluid substantially immediately upon mixing of the composition. The composition is then placed into the well such that the composition contacts the water immiscible fluid.

In a further aspect, embodiments relate to cementing a subterranean well having a casing and a borehole surface. A drilling rig is brought to the wellsite. A drill string and drill bit create a borehole, or well, that penetrates one or more subterranean formations. A water-base drilling fluid is employed to lubricate the drill bit and transport drill cuttings to the surface. The drill string is removed and a casing string is inserted into the well. The borehole surface and an outer casing surface are then coated with a first water-immiscible fluid. A composition is provided that comprises water, an inorganic cement, a second water immiscible fluid and one or more particulate materials that swell upon contact with the first and second water immiscible fluids, wherein the composition is not an emulsion. The composition is then placed into the well such that the composition contacts the first water immiscible fluid. The first and second water immiscible fluids may be the same.

In yet a further aspect, embodiments relate to cementing a subterranean well having a casing and a borehole surface. A drilling rig is brought to the wellsite. A drill string and drill bit create a borehole, or well, that penetrates one or more subterranean formations. A water-base drilling fluid is employed to lubricate the drill bit and transport drill cuttings to the surface. The drill string is removed and a casing string is inserted into the well. A composition is provided that comprises water, an inorganic cement, a first water-immiscible fluid and one or more particulate materials that swell upon contact with the water-immiscible fluid, wherein the composition is not an emulsion. The composition is placed into the well. Optionally, an outer casing surface and the borehole surface may be coated by a second water-immiscible fluid.

The preparation of the composition or slurry may occur at the surface with either batch mixing or continuous mixing equipment as is known in the art. A complete description of the design and operation of cement mixing equipment may be found in the following publication: Leugemors E, Metson J, Pessin, J-L, Colvard R L, Krauss C D and Plante M: "Cementing Equipment and Casing Hardware," in Nelson E B and Guillot D: *Well Cementing—Second Edition*, Houston, Schlumberger (2006): 343-434.

For all aspects, the casing surface may be composed of carbon steel, stainless steel, alloys such as INCONEL and MONEL, or a composite material containing a high temperature resin. The borehole surface may be a rock surface such as (but not limited to) a sandstone, a limestone, an evaporite or a shale.

For all aspects, the inorganic cement may be chosen from one or more members of the following list: portland cement, calcium aluminate cement, lime-silica blends, geopolymers, Sorel cements, chemically bonded phosphate ceramics, zeolites and cement-kiln dust. The cements may further comprise extenders such as fly ash, blast-furnace slag, silica, silica fume, nanosilica and nanoalumina.

For all aspects, the swellable particulate material may comprise ground rubber, polypropylene, uintaite, poly-2,2,1-bicyclo heptene (polynorbornene), alkylstyrene, cross-linked substituted vinyl acrylate copolymers, polyisoprene, polyvinyl acetate, polychloroprene, acrylonitrile butadiene, hydrogenated acrylonitrile butadiene, ethylene propylene diene monomer, ethylene propylene monomer, styrene-butadiene, styrene/propylene/diene monomer, brominated poly(isobutylene-co-4-methylstyrene), chlorosulphonated polyethylenes, polyacrylates, polyurethanes, silicones, chlorinated polyethylene, epichlorohydrin ethylene oxide copolymer, ethylene acrylate rubber, ethylene propylene diene terpolymers, sulphonated polyethylene, fluorosilicones, fluoroelastomer, substituted styrene acrylate copolymers and mixtures thereof. The swellable particulate material may also comprise ground rubber, polypropylene or unitaite or combinations thereof. Uintaite is a generic name for Gilsonite™—produced by the American Gilsonite Company.

The particle size of the swellable material may be between about 1 micrometer and 1 millimeter, or between about 10 micrometer and 1 millimeter or between about 100 micrometer and 1 millimeter. The concentration of the swellable material may be between about 1% and 50% by volume of the composition, or between about 1% and 35% by volume of the composition or between about 1% and 25% by volume of the composition.

For all aspects, the water-immiscible fluid may comprise crude oil, mineral oil, diesel oil, vegetable oil, linear alpha-olefins, xylene or toluene or combinations thereof. The volumetric concentration of the water-immiscible fluid in the composition may be between about 0.5% and 50%, or between 0.5% and 25% or between 0.5% and 10%.

For all aspects, the composition may further comprise expanding agents that include calcium sulfate hemihydrate, sodium chloride, sodium sulfate, aluminum powder, zinc powder, iron powder, magnesium powder, calcium oxide or magnesium oxide or combinations thereof. The concentration of the expanding agents may be between 0.5% and 15.0% by weight of cement (BWOC), or between 1.0% and 10.0% BWOC or between 1.0% and 5.0% BWOC.

For all aspects, the composition may also comprise customary additives such as retarders, accelerators, extenders, fluid-loss-control additives, lost-circulation additives, gas-migration additives, gas generating additives and antifoam agents. Further information concerning these materials may be found in the following publication: Nelson E B, Michaux M and Drochon B: "Cement Additives and Mechanisms of Action," in Nelson E B and Guillot D (eds): *Well Cementing—Second Edition*, Houston, Schlumberger (2006): 49-91.

Furthermore, the compositions may contain additives that enhance the flexibility and/or toughness of the set cement. Such additives include flexible particles having a Young's modulus below about 5,000 MPa and a Poisson's ratio above about 0.3. The particles may have a Young's modulus below about 2,000 MPa. Examples include polyethylene, acrylonitrile butadiene, styrene butadiene, polyamide, polytetrafluoroethylene, polyether ether ketone, perfluoroalkoxy polymer resin, fluorinated ethylenepropylene, polyethylenetetrafluoroethylene, polyvinylfluoride, polychlorotrifluororethylene, perfluoroelastomers, fluorocarbon elastomers and combinations thereof. Such additives may also include fibers selected from the list comprising polyamide, polyethylene and polyvinyl alcohol. Metallic microribbons may also be included. These materials may be present in the composition at concentrations between 1% and 50% by volume, or between 2% and 25% by volume or between 5% and 10% by volume.

The swellable particles may also be used in engineered-particle-size cement formulations involving multimodal blends of small, medium and coarse particles.

The water-immiscible fluid may comprise (but would not be limited to) mineral oil, diesel oil, vegetable oil, linear alpha-olefins, xylene, toluene and combinations thereof. The water-immiscible fluid may not irremediably affect the performance of cement additives present in the external phase. The volumetric concentration of the water-immiscible fluid may be between about 1% and about 50% of the total fluid volume, more preferably between about 5% and about 25% of the total fluid volume, and most preferably between about 10% and about 20% of the total fluid volume.

The level of expansion may be controlled by the type of swellable particles, the swellable-particle concentration and/or the volumetric ratio between the swellable particles and the water-immiscible fluid. Furthermore, the swellable particles may also impart cement-sheath flexibility by reducing the Young's modulus of the set cement. The level of linear expansion may be as high as 5%, as high as 3% or as high as 1%.

Those skilled in the art will appreciate that the disclosed method and use may not necessarily be applied throughout the entire length of the subterranean interval being cemented. In such cases, more than one cement-slurry composition is placed sequentially. The first slurry is called the "lead," and the last slurry is called the "tail." Under these circumstances, the expanding cement composition may be placed such that it resides in regions where hydrocarbons exist. In most cases, this will be at or near the bottom of the well; therefore, expanding cement composition may be the tail. Those skilled in the art will also appreciate that the disclosed method and use would not only be useful for primary cementing, but also for remedial cementing operations such as squeeze cementing and plug cementing.

Other and further objects, features and advantages of the present disclosure will be readily apparent to those skilled in the art upon a reading of the description of the examples which follows, taken in conjunction with the accompanying drawings.

EXAMPLES

The following examples serve to further illustrate the disclosure.

The following base cement slurry was employed for Examples 1 and 2 (Table 1). The slurry density was 1,400 kg/m$^3$ (11.65 lbm/gal). The solid volume fraction (SVF) was 50.5%.

TABLE 1

Base slurry composition

| Material | Function | Concentration |
| --- | --- | --- |
| Class G cement | binder | 50.2% BWOB* |
| ceramic microspheres | extender | 18.2% BWOB |
| ground rubber | swellable particle | 16.0% BWOB |
| microfine cement | binder | 16.0% BWOB |
| fresh water | — | 460 L/tonne** |
| polypropylene glycol | antifoam agent | 4.2 L/tonne |
| AMPS/acrylate polymer solution | fluid-loss additive | 8.4 L/tonne |
| polymelamine sulfonate | dispersant | 1.7 L/tonne |
| calcium lignosulfonate | retarder | 0.22% BWOB |

*by weight of solid blend;
**tonne of solid blend

Three base cement slurries were prepared according to the composition presented in Table 1. The slurry preparation was performed according to the recommended procedures published by the American Petroleum Institute (RP 10B). Tests were performed to measure the linear expansion of cement systems containing various amounts of oil. In these experiments, crude oil was added to the base slurry at 0%, 2% and 4% by volume of cement slurry.

Linear expansion tests were conducted according to the recommended API procedure described in API Publication RP 10B. An annular ring apparatus simulated the annulus of a well. The cement slurry was poured into the annular portion of the mold, the mold was lowered into a water bath and the slurry was allowed to cure submerged in water. The test period was 30 days and the curing temperature was 75° C. No expansion was observed with the control slurry containing 0% oil. The 30-day linear expansions of the 2% and 4% oil systems were 0.295% and 0.465%, respectively (FIG. 1).

Example 2

One base slurry was prepared according to the composition presented in Table 1. The slurry preparation was performed according to the recommended procedures published by the American Petroleum Institute (Publication RP 10B). No oil was added to the base slurry. The slurry was allowed to set and harden.

Figure 2:
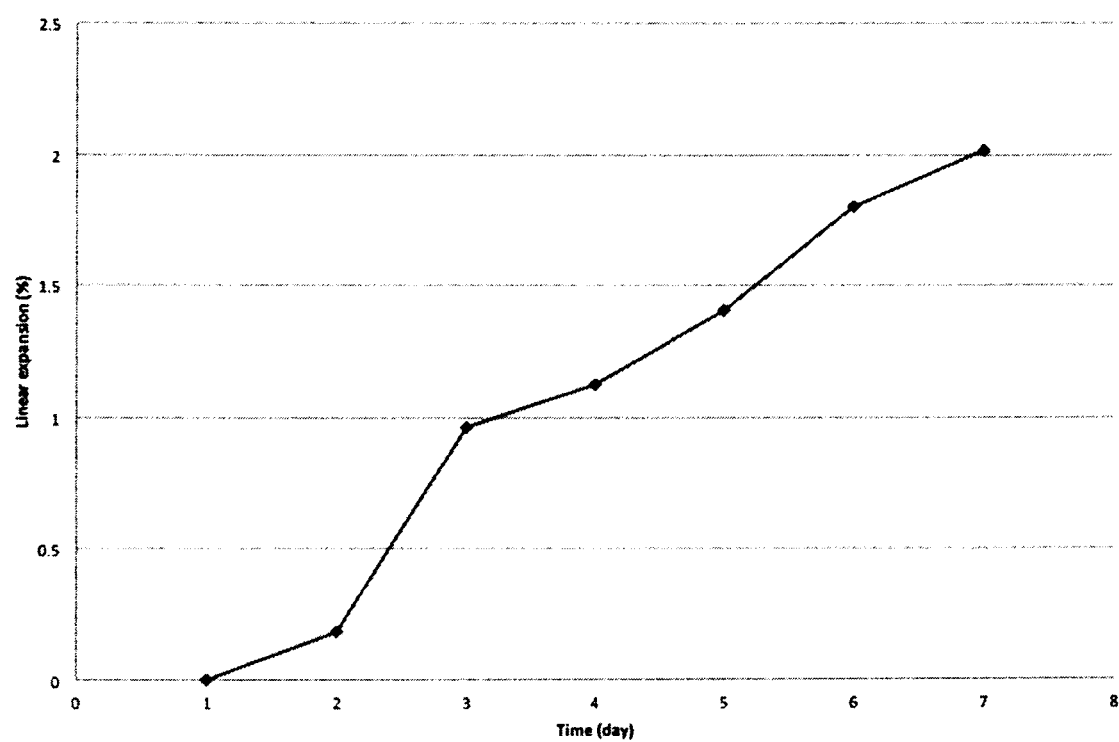
FIG. 2 is a graph showing the linear-expansion behavior of a cement system containing swellable particles and immersed in a synthetic oil-base mud.

A 7-day linear expansion test was conducted at 75° C. according to the recommended API procedure described in Publication RP 10B. An annular ring apparatus simulated the annulus of a well. The cement slurry was poured into the annular portion of the mold and allowed to set. Then the mold was lowered into a bath filled with a synthetic oil-base mud to simulate contact with a water immiscible fluid. The linear expansion result was 2.02% (FIG. 2).

Example 3

A cement slurry was prepared with the following composition (Table 2). The slurry density was 1,900 kg/m$^3$. The SVF was 52.0%.

TABLE 2

Slurry Composition

| Material | Function | Concentration |
| --- | --- | --- |
| Class G cement | binder | 36.0% BWOB |
| hematite | weighting agent | 35.0% BWOB |
| ground rubber | swellable particle | 16.0% BWOB |
| microfine silica | extender | 13.0% BWOB |
| fresh water | — | 407 L/tonne |
| polypropylene glycol | antifoam agent | 4.2 L/tonne |
| polyvinylpyrrolidone | fluid-loss additive | 54.3 L/tonne |
| polymelamine sulfonate | dispersant | 2.5 L/tonne |

A shear bond test was conducted according to the API recommended procedure (Publication RP 10B). Two steel test molds were cleaned such that their surfaces were free of rust or damage. The internal surfaces of the molds were then coated with a crude oil. Then, the molds were filled to the brim with the cement slurry, and the cement slurry was allowed to cure at atmospheric pressure and temperature for 72 hours. After curing, the molds were placed in a hydraulic press, and the force required to release the cured cement from each mold was measured. The force was then divided by the internal surface area of the mold to calculate the shear bond strength. The average shear-bond strength was 82.7 kPa.

Example 4

The cement slurry of Table 2 was prepared. 3 vol % crude oil was then mixed into the slurry. The shear bond test described in Example 3 was then performed. The average shear-bond strength was 138 kPa.

Comparative Example 1

A neat Class G cement slurry was prepared at a density of 1,900 kg/m$^3$. The slurry did not contain a swellable particulate material. Fresh water was the mixing fluid.

The shear bond test described in Example 3 was then performed. During the shear-bond test, essentially zero force was required to dislodge the cement sample and push it out of the mold. No bonding had developed between the cement and the inner mold surface.

Although various embodiments have been described with respect to enabling disclosures, it is to be understood that this document is not limited to the disclosed embodiments. Variations and modifications that would occur to one of skill in the art upon reading the specification are also within the scope of the disclosure, which is defined in the appended claims.

The invention claimed is:

1. A method, comprising:
   drilling a subterranean well with a water-base drilling fluid;
   inserting a casing string into the subterranean well;
   pumping a pill of a water-immiscible fluid into the subterranean well, thereby coating a borehole surface and an outer surface of the casing string in the subterranean well with the water-immiscible fluid;
   after pumping the pill, providing a composition comprising water, an inorganic cement and one or more particulate materials that swell upon contact with the water-immiscible fluid, wherein the composition is not an emulsion; and injecting the composition into the subterranean well to contact the water-immiscible fluid, and thereby swelling the one or more particulate materials to form a seal.

2. The method of claim 1, wherein the inorganic cement comprises one or more members selected from the group consisting of portland cement, calcium aluminate cement, lime-silica blends, geopolymers, Sorel cements, chemically bonded phosphate ceramics, zeolites and cement-kiln dust.

3. The method of claim 1, wherein the one or more particulate materials comprises one or more members selected from the group consisting of ground rubber, polypropylene, uintaite, poly-2,2,1-bicyclo heptene, alkylstyrene, crosslinked substituted vinyl acrylate copolymers, polyisoprene, polyvinyl acetate, polychloroprene, acrylonitrile butadiene, hydrogenated acrylonitrile butadiene, ethylene propylene diene monomer, ethylene propylene monomer, styrene-butadiene, styrene/propylene/diene monomer, brominated poly(isobutylene-co-4-methylstyrene), chlorosulphonated polyethylenes, polyacrylates, polyurethanes, silicones, chlorinated polyethylene, epichlorohydrin ethylene oxide copolymer, ethylene acrylate rubber, ethylene propylene diene terpolymers, sulphonated polyethylene, fluorosilicones, fluoroelastomer and substituted styrene acrylate copolymers.

4. The method of claim 1, wherein, prior to swelling, the one or more particulate materials has a particle size between 1 micrometer and 1 millimeter, and the one or more particulate materials is present at a concentration between 1% and 50% by volume of the composition.

5. The method of claim 1, wherein the composition further comprises calcium sulfate hemihydrate, sodium chloride, sodium sulfate, aluminum powder, zinc powder, iron powder, magnesium powder, calcium oxide or magnesium oxide or combinations thereof.

6. The method of claim 1, wherein the water immiscible fluid comprises one or more members selected from the group consisting of crude oil, mineral oil, diesel oil, vegetable oil, linear alpha-olefins, xylene and toluene.

7. A method, comprising:
drilling a subterranean well with a water-base drilling fluid;
inserting a casing string into the subterranean well;
pumping a pill of a first water-immiscible fluid into the subterranean well, thereby coating an outer surface of the casing string and a borehole surface with the first water-immiscible fluid;
after pumping the pill, providing a composition comprising water, a second water-immiscible fluid, an inorganic cement and one or more particulate materials that swell upon contact with the first or second water-immiscible fluid, wherein the composition is not an emulsion; and
injecting the composition into the subterranean well to contact the first water-immiscible fluid, and thereby swelling the one or more particulate materials to form a seal.

8. The method of claim 7, wherein the inorganic cement comprises one or more members selected from the group consisting of portland cement, calcium aluminate cement, lime-silica blends, geopolymers, Sorel cements, chemically bonded phosphate ceramics, zeolites and cement-kiln dust.

9. The method of claim 7, wherein the one or more particulate materials comprises one or more members selected from the group consisting of ground rubber, polypropylene, uintaite, poly-2,2,1-bicyclo heptene, alkylstyrene, crosslinked substituted vinyl acrylate copolymers, polyisoprene, polyvinyl acetate, polychloroprene, acrylonitrile butadiene, hydrogenated acrylonitrile butadiene, ethylene propylene diene monomer, ethylene propylene monomer, styrene-butadiene, styrene/propylene/diene monomer, brominated poly(isobutylene-co-4-methylstyrene), chlorosulphonated polyethylenes, polyacrylates, polyurethanes, silicones, chlorinated polyethylene, epichlorohydrin ethylene oxide copolymer, ethylene acrylate rubber, ethylene propylene diene terpolymers, sulphonated polyethylene, fluorosilicones, fluoroelastomer and substituted styrene acrylate copolymers.

10. The method of claim 7, wherein, prior to swelling, the one or more particulate materials has a particle size between 1 micrometer and 1 millimeter, and the one or more particulate materials is present at a concentration between 1% and 50% by volume of the composition.

11. The method of claim 7, wherein the first and second water immiscible fluids are chosen from one or more members selected from the group consisting of crude oil, mineral oil, diesel oil, vegetable oil, linear alpha-olefins, xylene and toluene, and the second water immiscible fluid is present in the composition at a volumetric concentration between 0.5% and 50%.

12. The method of claim 7, wherein the composition further comprises calcium sulfate hemihydrate, sodium chloride, sodium sulfate, aluminum powder, zinc powder, iron powder, magnesium powder, calcium oxide or magnesium oxide or combinations thereof.

\* \* \* \* \*